US008953702B2

(12) United States Patent
Aubert et al.

(10) Patent No.: US 8,953,702 B2
(45) Date of Patent: Feb. 10, 2015

(54) PRECODING MATRIX INDEX SELECTION PROCESS FOR A MIMO RECEIVER BASED ON A NEAR-ML DETECTION, AND APPARATUS FOR DOING THE SAME

(75) Inventors: Sébastien Aubert, Nice (FR); Andrea Ancora, Nice (FR)

(73) Assignee: St-Ericsson SA, Plan-les-Ouates (CH)

( * ) Notice: Subject to any disclaimer, the term of this patent is extended or adjusted under 35 U.S.C. 154(b) by 0 days.

(21) Appl. No.: 13/995,766

(22) PCT Filed: Dec. 20, 2011

(86) PCT No.: PCT/EP2011/006439
§ 371 (c)(1),
(2), (4) Date: Aug. 5, 2013

(87) PCT Pub. No.: WO2012/084201
PCT Pub. Date: Jun. 28, 2012

(65) Prior Publication Data
US 2013/0301749 A1 Nov. 14, 2013

Related U.S. Application Data

(60) Provisional application No. 61/441,087, filed on Feb. 9, 2011.

(30) Foreign Application Priority Data

Dec. 21, 2010 (EP) .................................... 10368050

(51) Int. Cl.
*H04B 7/02* (2006.01)
*H04B 7/04* (2006.01)
*H04B 7/06* (2006.01)

(52) U.S. Cl.
CPC ............ *H04B 7/0456* (2013.01); *H04B 7/0452* (2013.01); *H04B 7/0639* (2013.01);
(Continued)

(58) Field of Classification Search
CPC .. H04B 7/0639; H04B 7/0456; H04B 7/0452; H04B 7/0413; H04B 7/0619; H04B 7/0697; H04B 7/0404; H04B 7/0684; H04B 7/02; H04B 7/061; H04B 7/0854; H04B 7/0871; H04B 7/04; H04L 25/03343; H04L 5/0023; H04L 25/0204; H04L 2025/03414; H04L 5/0048; H04L 25/0224; H04L 25/0242; H04L 25/0206; H04L 27/2601; H04L 25/0202; H04L 25/024; H04L 25/03191; H04L 25/03968; H04L 27/2675
USPC ......... 375/267, 260, 299, 347, 262, 349, 341; 455/101, 132, 500, 102
See application file for complete search history.

(56) References Cited

U.S. PATENT DOCUMENTS

2009/0046768 A1* 2/2009 Pare, Jr. ........................ 375/220
2010/0048148 A1 2/2010 Dietrich

FOREIGN PATENT DOCUMENTS

EP 2 209 220 A1 7/2010
EP 2209220 A1 * 7/2010 ............... H04B 7/04
(Continued)

OTHER PUBLICATIONS

International Search Report issued in corresponding International application No. PCT/EP2011/006439, date of mailing Mar. 28, 2012.
(Continued)

*Primary Examiner* — Rahel Guarino
(74) *Attorney, Agent, or Firm* — Patent Portfolio Builders PLLC

(57) ABSTRACT

A process selects a Precoding Matrix Index (PMI) in a Multiple In Multiple Out (MIMO) receiver used in a wireless communications system including a base station communicating with User Equipments (UE) through a downlink and uplink channel. The base station applies a precoding on the transmit symbol vector based on a matrix selected from a set of predefined matrices and identified by a PMI index computed by the UE and forwarded to the base station via the uplink. The process includes estimating the MIMO channel matrix H of a given set of resources blocks comprising received symbol vectors, estimating the variance $\sigma^2$ of the additive noise (AWGN), and computing for each particular matrix comprised within the set of predefined matrices a cost function representative of the orthogonality of the matrix MIMO channel matrix H. The process further includes comparing the values of the cost function and transmitting to the base station the index corresponding to the matrix corresponding to the best conditioned MIMO channel matrix according to the comparison of the values.

14 Claims, 8 Drawing Sheets

(52) U.S. Cl.
CPC .................................. *H04B 7/0697* (2013.01)
USPC ........... 375/267; 375/260; 375/299; 375/347; 375/262; 375/349; 375/341; 455/101; 455/132; 455/500; 455/102

(56) References Cited

FOREIGN PATENT DOCUMENTS

| WO | 2008/086239 A1 | | 7/2008 | |
|---|---|---|---|---|
| WO | WO 2008/086239 | * | 7/2008 | ............... H04Q 7/00 |
| WO | WO 2008086239 A1 | * | 7/2008 | ............... H04Q 7/00 |

OTHER PUBLICATIONS

NXP Semiconductors et al., "Feedback and Precoding Techniques for MU-MIMO for LTE-A," 3GPP Draft, R1-083244, 3rd Generation Partnership Project (3GPP), Mobile Competence Centre, 650, Route des Lucioles, F-06921 Sophia-Antipolis Cedex, France, Aug. 13, 2008, XP050316656.

Motorola, "Coexistence of Rel-8 PMI/CQI/RI Feedback and Explicit Feedback," 3GPP Draft, R1-100208, 3rd Generation Partnership Project (3GPP), Mobile Competence Centre, 650, Route des Lucioles, F-06921 Sophia-Antipolis Cedex, France, vol. RAN WG1, No. Valencia, Spain, Jan. 16, 2010, XP050418374.

"3rd Generation Partnership Project; Technical Specification Group Radio Access Network; Evolved Universal Terrestrial Radio Access (E-UTRA); Physical Channels and Modulation (Release 9)," 3GPP Draft, DRAFT36211-910, 3rd Generation Partnership Project (3GPP), Mobile Competence Centre, 650, Route des Lucioles, F-06921 Sophia-Antipolis Cedex, France, vol. RAN WG1, Mar. 22, 2010, XP050417603.

* cited by examiner

Fig. 1: LR-Aided detection block diagram

CDF of the $od_t$ for both a 2x2 (a) and a 4x2 (b) MIMO precoding schemes and a given SNR of 0dB.

CDF of the $od_f$ for both a 2x2 (a) and a 4x2 (b) MIMO precoding schemes and a given SNR of 20dB.

CDF of the $\sigma d_i$ for both a 2x2 (a) and a 4x2 (b) MIMO precoding schemes and a given SNR of 20dB

PRECODING MATRIX INDEX SELECTION PROCESS FOR A MIMO RECEIVER BASED ON A NEAR-ML DETECTION, AND APPARATUS FOR DOING THE SAME

TECHNICAL FIELD

The invention relates to the field of wireless communications and more particularly to a process for performing the selection of a Precoding Matrix Index (PMI) for a MIMO receiver using near-ML detection, such as Lattice Reduction Aided (LRA) mechanism, and a receiver for doing the same.

BACKGROUND ART

Spatial multiplexing is a common scheme for Multiple-In-Multiple-Out (MIMO) communication systems lying on the transmission over different antennas of independent information streams.

Spatial multiplexing is conventionally combined with precoding which improves the ergodic capacity of the resulting transmission channel. FIG. 1 particularly illustrates the example of a 2×2 MIMO communication—composed of a downlink 1 and an uplink 2—between a base station 10 and a mobile equipment, such as an User Equipment.

Considering base station 10, the latter includes a channel coding block 11 providing two independent data streams to a MIMO Precoder 12 which applies a precoding precoding based on one particular matrix W selected from a codebook $\mathcal{W}$ of matrices known at both the base station 10 and the UE 20, before conveying such data streams over two transmit antennas 13 and 14.

On the other side, UE 20 includes two receiving antennas 23 and 24 which generate the received streams which are then forwarded to a MIMO detector performing symbols detection following channel estimation. Generally speaking, the detection may be based on either a linear near-ML detector, as illustrated in FIG. 2, or a non-linear near-ML (near Maximum-Likelihood) detection such as Sphere Decoders.

In the particular case of a closed-loop system, the detector is associated with Precoding Matrix Index block 22 which is arranged to compute one particular value of an index which is conveyed to the transmitting base station 10 through uplink 2 so that the latter can uniquely selects one advantageous matrix W to be used in the precoding process.

At this point, the closed-loop system model reads simultaneously:

$$y = HWx + n = Hpx + n = \tilde{H}pz + n$$

with x being the transmit symbol vector withdrawn from a finite and known constellation, y being the receive symbol vector, H being the channel matrix, W being the precoding matrix and n being an additive White gaussian noise (AWGN) of varience $\sigma^2_n$. The effective channel matrix reads HW.

The concept of precoding in spatial multiplexing systems raises two main issues:

The first issue—which is only mentioned here for the sake of clarity and which will not be considered in the present application—consists in the design the set $\mathcal{W}$ given a chosen selection criterion. Such issue is particularly addressed in the following prior art reference (3):

The second issue—which is particularly addressed in the present application—consists in the determination of an advantageous precoding matrix from a codebook $\mathcal{W}$ through an appropriate selection criterion.

One conventional technique is known in the art and designated as the so-called Capacity-Selection Criterion (C-SC), which is recommended by 3GPP is described in reference 3GPP TS 36.211 V9.1.0 (2010-03), Technical Specification, 3rd Generation Partnership Project; Technical Specification Group Radio Access Network; Evolved Universal Terrestrial Radio Access (E-UTRA); Physical Channels and Modulation, (Release 9).

The conventional C-SC technique is particularly adapted to the use of a Minimum Mean Square Estimation (MMSE) detector and clearly optimal for such MMSE detector.

Basically, in such C-SC prior art technique, the index selection is based on the SINR maximization with the knowledge of any precoding matrix and the estimation of the channel matrix in reception, and reads:

$$SINR_k(W, H) = \frac{1}{\left(I + \frac{1}{\sigma_n^2} P^H H^H H P\right)^{-1}_{k,k}} - 1,$$

where $v^2_n$ is the noise variance, and under the assumption of normalized power constellations.

In the particular case of a 2×2 MIMO system, the expression above rewrites—for the first layer:

$$SINR_0(W, H) = \frac{|U_{00}|^2}{|U_{01}|^2 + \sigma_n^2 |B_{00}|^2 + \sigma_n^2 |B_{01}|^2},$$

where $$U = (H_P^H H_P + \sigma_n^2 I)^{-1} H_P^H H_P$$

The Capacity-Selection Criterion (C-SC) consists in choosing w such that:

$$W = \arg\max_{W_i \in w} \{\Sigma_k SINR_k(W_i, H)\}.$$

While the C-SC technique is the optimal in the case of the widely spread linear MMSE detector,—because of the maximization of the capacity which results—it should be noticed that such technique is less advantageous in the case of a more elaborated and sophisticated decoding technique, such as based on a non linear technique, such as achieved by a near-Maximum Likehood detection.

Indeed, thanks to its level of sophistication, a near-Maximum Likehood technique already achieves a high degree of capacity given a channel and, in such situation, the known Capacity-Selection Criterion (C-SC) index selection which is recommended by the 3GPP shows limited interest.

The technical problem to be solved by the present invention is to design a new index selection mechanism which is more adapted to the high efficiency of a near-ML decoder, such as a decoder using a Lattice Reduction technique.

SUMMARY OF THE INVENTION

It is an object of the present invention to provide a precoding process for a MIMO communication system, which is adapted to the use of a near-ML receiver involving a Lattice reduction process.

It is a further object of the present invention to provide an alternative index selection process to be used in a closed loop precoding technique which fully fits a Lattice-Reduction Aided decoding process.

It is another object of the present invention to significantly reduces the complexity of a MIMO receiver based on a lattice reduction mechanism.

It is still another object of the present invention to achieve a MIMO LRA detector which is combined with an enhanced precoding index selection mechanism which can be used in a closed loop precoding technique of a MIMO communication system.

These and other objects of the invention are achieved by means of a PMI selection process which involves the steps of:

considering the provided MIMO channel matrix estimation H of a given set of resources blocks comprising received symbol vectors;

computing for each particular matrix comprised within said set of predefined matrix a cost function Fi (Wi, H,) being representative of the orthogonality of said matrix MIMO channel matrix H;

comparing the values of said cost function Fi; and transmitting to said base station the index i corresponding to the Fi representative of the best conditioned MIMO channel matrix.

In one embodiment, the cost function Fi (Wi, H,) is based on the condition number.

Preferably, the cost function Fi (Wi, H, $\sigma^2_n$) is based on the orthogonal deficiency of said MIMO channel matrix, defined as follows:

$$od(WH) = 1 - \frac{\det(H^H H)}{\prod_{i=1}^{n_T} \|W H_i\|^2}$$

In one embodiment, the process is used in an OFDM receiver supporting MIMO spatial-multiplexing mode, such as IEEE 802.16, IEEE 802.11, 3GPP LTE and 3GPP LTE-A.

In one particular embodiment, the receiver is a 2×2 MIMO receiver or a 4×2 MIMO receiver.

The invention also achieves a receiver for a Multiple-In Multiple-Out (MIMO) wireless communications system comprising a base station communicating with User Equipments through a downlink and uplink channels. The base station applies a precoding on the transmit symbol vector, which precoding is based on a matrix Wi selected from a set of predefined matrices known at both the base station and the UE.

The computation of the PMI index is based on the use of a cost function which is representative of the orthogonality of the matrix so as to focus the precoding applied by the base station for the purpose of reducing the complexity of the lattice reduction step to be performed within the mobile equipment with limited resources and latency.

More particularly, the index returned by the mobile to the base station in the closed loop is computed by means of a comparison of a cost function Fi (Wi, H), where Fi is representative of the orthogonality, or the conditioning of the matrix channel H.

In one particular embodiment, the cost function is based on the use of the orthogonal deficiency (od) defined as follows:

$$od(WH) = 1 - \frac{\det(H^H H)}{\prod_{i=1}^{n_T} \|W H_i\|^2}$$

The invention finally achieves a UE comprising a OFDM receiver supporting MIMO spatial-multiplexing mode, such as IEEE 802.16, IEEE 802.11, 3GPP LTE and 3GPP LTE-A.

DESCRIPTION OF THE DRAWINGS

Other features of one or more embodiments of the invention will be best understood by reference to the following detailed description when read in conjunction with the accompanying drawings.

DESCRIPTION OF THE PREFERRED EMBODIMENT

Figure 1:
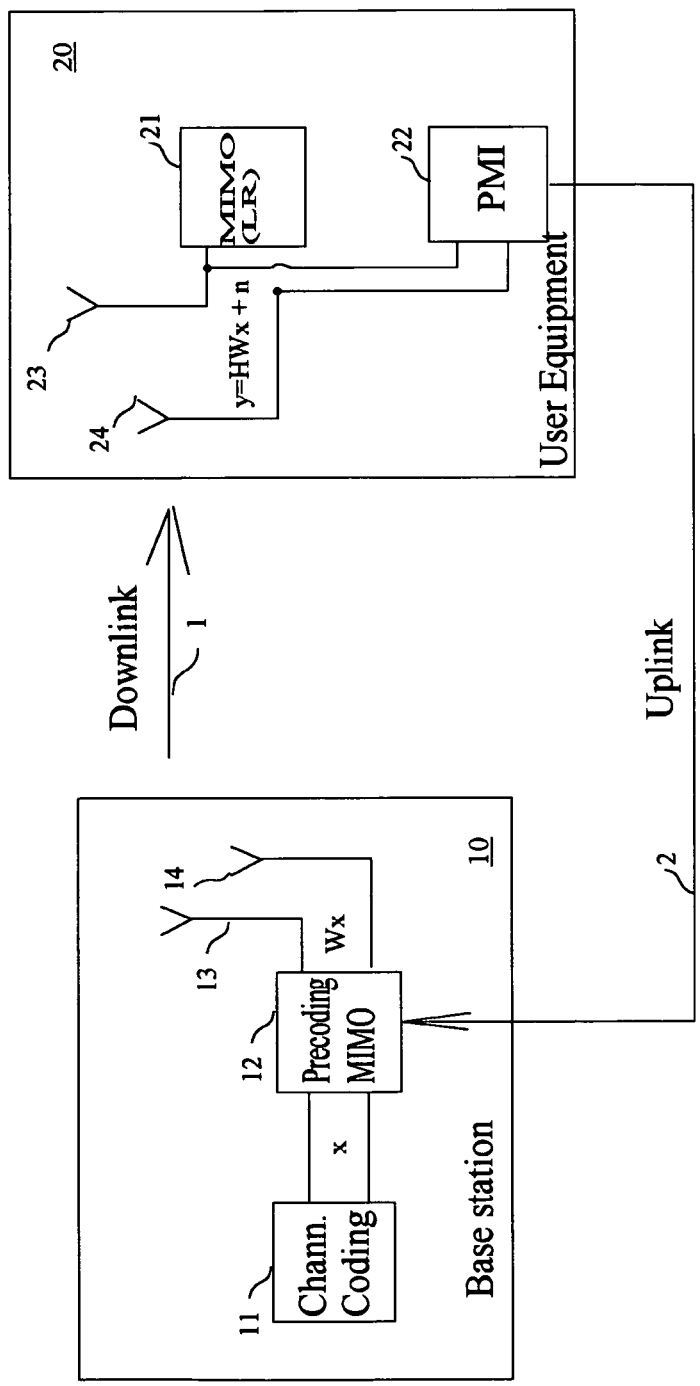
FIG. 1 illustrates an example of a 2×2 MIMO communication with a base station 10 communicating with a mobile, such as a User Equipment 20.

The process which will be described hereinafter can be embodied in a wide number of applications. Clearly, any OFDM standard supporting MIMO spatial-multiplexing mode, e.g. IEEE 802.16, IEEE 802.11, 3GPP LTE and 3GPP LTE-A, can take advantage of the process described below.

More particularly, the invention is particularly advantageous in the case of a large number of antennas and consequently in the case of the 3GPP LTE-A standard.

The process which will be described below with details is particularly useful for decreasing the complexity of a Lattice Reduction-Aided (LRA) detector which achieves high efficiency.

Indeed, it has been discovered by the inventors that Lattice Reduction-Aided (LRA) detection can be advantageously combined with a closed loop precoding technique, associated with one new Precoding Matrix Index (PMI) selection criterion having the effect of improving the conditioning of the channel matrix in the perspective of the LRA computation.

To achieve this, the PMI selection mechanism is non longer based on the computation of the SINR (as in the conventional Capacity-Selection Criterion (C-SC)), but is based on a new parameter which is representative of the conditioning of the channel matrix, in other words its orthogonality.

In one particular, embodiment, the PMI selection mechanism is based on the so-called Orthogonal Deficiency parameter which shows great interest since it is strongly cheaper to compute than the condition number.

Therefore, a significant reduction of both the mean and maximal computational complexity of the LR mechanism can be expected and near-optimal detector performance can be achieved at an expected polynomial computational cost in CL case.

As presented in the following, both LA and SA computational complexity UBs can be decreased with an appropriate selection criterion.

For the sake of clarity, theoretical considerations of the LRA mechanism will be introduced (I), prior to the description of one particular embodiment of a process of selection of the PMI to be used in a closed loop precoding technique.

I. Theoretical Considerations on Lattice Reduction Aided Detection Techniques

The optimal Maximum Likelihood (ML) detector can be efficiently approximated by the use of several techniques such as Lattice Reduction Aided detectors (linear or not), commonly referred as near-ML techniques. These detection schemes have been widely studied in the Open-Loop (OL) case, in term of computational complexity and performance while the CL case has been neglected. In term of uncoded Bit Error Rate (BER) performance, the LRA techniques have been shown to be near-optimal for a polynomial computational complexity.

Various LR algorithms have been proposed. In this patent proposal, the popular Lenstra-Lenstra-Lovász (LLL) Algorithm (LA) [2] and the more recent Seysen Algorithm (SA) [2] have been considered.

While it classically reads: y=Hx+n, where $x \in \mathcal{C}^{n_T}$ and $y \in \mathcal{C}^{n_R}$ denote the system input and output respectively, $H \in \mathcal{C}^{n_R \times n_T}$ the channel matrix and $n \in \mathcal{C}^{n_R}$ the AWGN, the equivalent system model can then be rewritten:

$$y = \tilde{H}z + n$$

Any Lattice Reduction (LR)-Aided (LRA) detector principle lies in the consideration of a reduced channel matrix $\tilde{H}=HT$. Consequently, the introduction of the transformed signal $Z=T^{-1}x$, where $\tilde{H} \in \mathcal{C}^{n_R \times n_T}$ denotes the reduced lattice generator matrix and $T \in \mathcal{Z}_\mathcal{C}^{n_T \times n_T}$ the transformation matrix that has to be unimodular by definition, offers an advantage in the use of classical linear equalizers. In order to further introduce the useful vocabulary, the notation $\mathcal{Z}_\mathcal{C}$ is defined as the set of complex integers such that $\mathcal{Z}_\mathcal{C} = \mathcal{Z} + i\mathcal{Z}$, with $i^2 = -1$, and the vector X is withdrawn independently from a Quadrature Amplitude Modulation (QAM)ξ.

By discrediting in a first time any precoding step at the transmitter, let us only consider the LRA detectors problematic in reception. In particular, the simplified block-diagram of a LRA-Zero Forcing (ZF) is depicted in FIG. 2.

Figure 2:
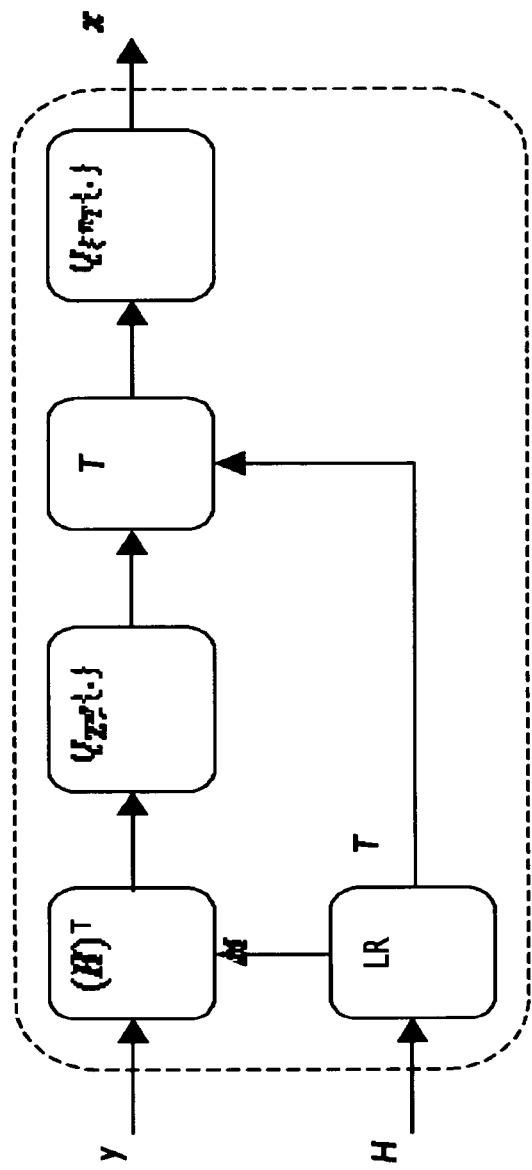
FIG. 2 recalls the general principle of a LR-Aided detection block diagram

In FIG. 2, $(\cdot)^\dagger$ denotes the pseudo-inverse, $$Q_{\mathcal{Z}_\mathcal{C}^{n_T}}\{\cdot\}$$

the quantization operation to the $n_T$-th dimensional integer lattice, $Q_{\xi^{n_T}}\{\cdot\}$ the mapping of the estimates onto the corresponding symbols belonging to the $\xi^{n_T}$ constellation and $\tilde{x}$ the estimation of the transmit signal.

In order to quasi-achieve the full diversity in reception, various LR algorithms have been proposed. Let us evoke the optimal (the orthogonality is maximized) but with exponential computational complexities Minkowski and Korkine-Zolotareff algorithms. It has been shown that these solutions are only feasible in the 2×2 MIMO case, which does not match with LTE requirements. As an alternative, the widely popular LA can approach the optimal performance while having a polynomial complexity in mean [2]. More recently, the SA has been presented as an alternative that offers better performances but for a higher computational complexity [2].

The LA transforms an input basis H into a LLL-reduced basis $\tilde{H}$. It consists in a local approach that lies on satisfying two conditions of orthogonality and norm reduction, respectively:

$$\Re\{\mu_{i,j}\}\Re\{\mu_{i,j}\} \leq \frac{1}{2}, \forall\, 1 \leq j < i \leq n_T,$$

where $$\mu_{i,j} = \frac{\langle H_i, \tilde{H}_j \rangle}{\|\tilde{H}_j\|^2}, \text{ and}$$

$$\|\tilde{H}_i\|^2 = (\delta - |\mu_{i,i-1}|^2)\|\tilde{H}_{i-1}\|^2, \forall\, 1 < i \leq n_T,$$

where δ, with $$\frac{1}{2} < \delta < 1,$$

is a factor selected to achieve a good performance/quality trade-off [4]. The parameter is chosen as $$\delta = \frac{3}{4},$$

as commonly suggested, and $\tilde{H}_i = \tilde{H}_i - \Sigma_{j=1}^{i-2}\{[\mu_{i,j}]H_j\}$. For sake of vocabulary, a basis that respects the condition (1) is said to be Lovász δ—reduced and the condition (3) is said to size-reduced.

The SA consists in a global approach that lies on the minimization of the Seysen orthogonality measure:

$$S(\tilde{H}) = \Sigma_{i=1}^{n_T}\|\tilde{H}_i\|^2\|\tilde{H}_i^\#\|^2,$$

Both the LA and the SA have been briefly presented, their performance and subsequently their BER performance with many detectors have been introduced in several publications and make the LA algorithm more convenient for implementation than the SA. Consequently, the LA is particularly considered in the following of the patent proposal and some algorithmic details such as some optimizations will be further presented.

Let us introduce the QR Decomposition (QRD) of H that reads H=QR, where the matrix $Q \in \mathbb{C}^{n_R \times n_T}$ has orthonormal columns and $R \in \mathbb{C}^{n_T \times n_T}$ is an upper-triangular matrix with real diagonal entries. It has been shown that the QRD outputs of H are possible starting points for the LA, and it has been introduced [2] that the Sorted QRD (SQRD) provides better starting points since it finally leads to a significant reduction of the mean computational complexity and of the corresponding variance. Also, another classical result consists in directly considering the complex LA that offers an average complexity saving of nearly 50% compared to the straightforward real model system extension with negligible performance loss. This algorithm will be considered, unless otherwise indicated.

Through these points, the computational complexity Upper Bound (UB) has been shown [2] to be distinguished between the pre-processing step:

$$C_{SQRD} = 10n_R n_T^2 - 4n_R n_T - 1.5n_T^2 + 1.5n_T,$$

and the two conditions defined in (1) and (2), namely:

$$C_{ortho} = 18n_T - 10,$$

$$C_{norm} = 28(n_R + n_T) + 16,$$

that are performed a k number of iterations times.

This is the key point since its estimation is a difficult task. In particular, the number of iterations depends on the condition number of the channel matrix [5] and is consequently unbounded. Nevertheless, the expected k (and consequently the expected total computational complexity) has been shown to be polynomial:

$$E\{k\} \le n_T^2 \left( \log_\delta \left( \frac{n_T}{n_R - n_T + 1} \right) \right) + \frac{2.240}{\log_e t} + n_T,$$

by defining E{•} as the expectation and where.

As a conclusion, the worst-case computational complexity in the Open Loop (OL) case is exponential in the number of antennas. This restrictive aspect may be overstepped though the consideration that the computational complexity in mean is polynomial in the number of antennas. This way, a thresholded version of the algorithm offers convenient results.

Any modification or consideration aiming at bounding the computational complexity of any LR algorithm is essential for supporting the interest of all a family of LRA detectors.

II. Description of One Particular Process

Figure 8:
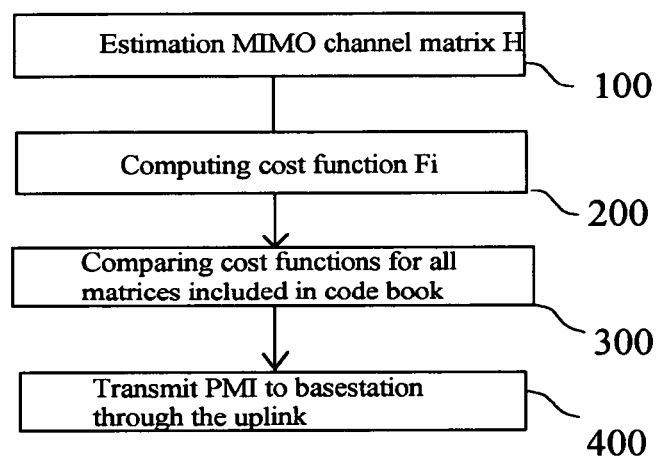
FIG. 8 illustrates one embodiment of a process for selecting a PMI index for a closed loop precoding technique.

It will now be described with reference to FIG. 8, one particular embodiment of a process for selecting the PMI index to be reported in uplink to the base station.

The process starts with a step 100 wherein the MIMO channel matrix H is estimated. Generally speaking, channel estimation is well known by the skilled man and will not be further elaborated. It suffices to recall that the estimation of the channel is based on the use of so-called reference signals (or pilots) which, when periodically transmitted—allows the User Equipment (UE) for performing the estimation of the channel matrix.

Furthermore, it should be noticed that the channel estimation can be performed on one particular Resource block or, alternatively, on a sequence of consecutive resources blocks in accordance with different parameters.

Then, in a step 200, the process proceeds with the computation, for each particular matrix comprised within said set of predefined matrix (assumed to be known at both the base station and the UE), a cost function Fi (Wi, H), depending on the channel (estimated in step 100) and any tested precoding matrix (Wi).

Step 200 thus entails the computation of a sequence of Fi values, with i varying from 1 to N (assuming that the given codebook comprises N distinctive matrices).

In the conventional so-called Capacity-Selection Criterion (C-SC), it is the Signal to Interference plus Noise Ratio SNRi—depending on Wi, H, $\sigma_n^2$—which is computed for each particular matrix composing the codebook, and the selection of the higher value of the SINRi returns the value of the index corresponding to the maximal capacity.

The invention deviates from such known mechanism (and particularly recommended by the 3GPP standard) by using a different cost function which advantageously combine with a LRA based MIMO receiver, the new cost function only depending on H and Wi—more particularly depends on $W_i H$—and no longer being related to the signal to noise ratio.

The new cost function which is proposed as an alternative to the recommended standard SNRi mechanism, is now based on a parameter which is closely related to the orthogonality of the matrix $HW_i$, such as for instance the condition number. In particular, the cost function is chosen so as to be maximized or minimized with the orthogonality of the matrix $HW_i$ However, it should be noticed that the condition number is generally complex to compute and requires a significant amount of digital processing resources.

In one very advantageous embodiment, the process uses a different cost functions, is which is based on the so-called Orthogonal Deficiency (od) which is a parameter defined in Algebra and also representative of the orthogonality of the matrix WH.

$$od(WH) = 1 - \frac{\det(H^H H)}{\prod_{i=1}^{n_T} \|WH_i\|^2}$$

since the general expression $(WH)^H WH = HW^H WH$ clearly rewrites $H^H H$, due to the unitary criterion in the codebook design.

The od parameter is easier to compute than the condition number, thus reducing complexity of the receiver.

When the process has completed the computation of the cost function for all matrices included in the predefined codebook, the process then proceeds to a step 300 wherein the value of the cost function Fi showing the best conditioning is being determined.

In the particular case of the Orthogonal Deficiency, the process proceeds with the determination, in step 300, of the minimum value among all values of Odi (HW$_i$) being computed.

Once identified, the process proceeds to a step 400 wherein the corresponding index is returned to the base station through uplink 2 for the purpose of determining the proper precoding matrix to be used by the latter base station.

Figure 3:
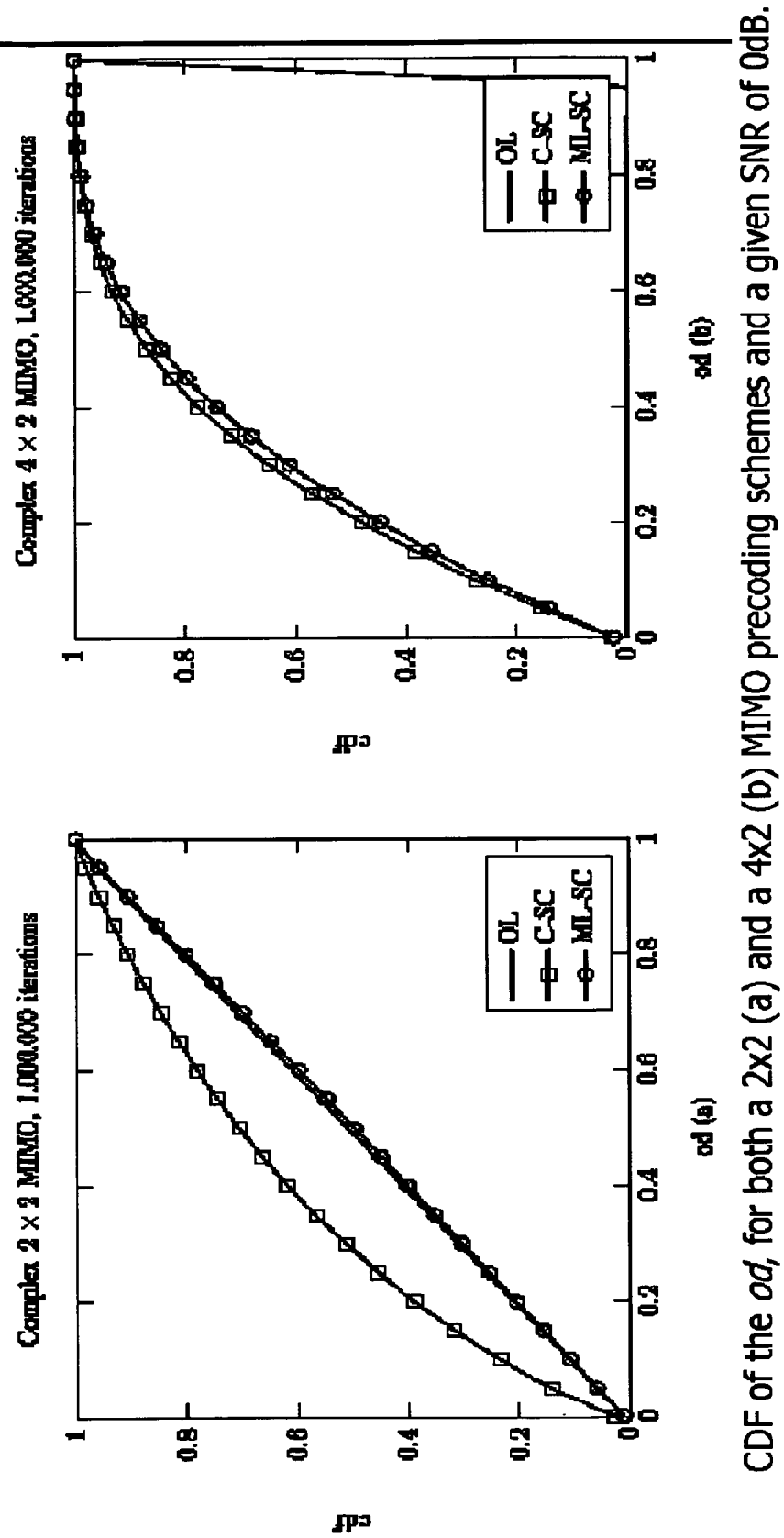
FIG. 3 illustrates the Cumulative Density Function (CDF) of the Orthogonal Deficiency (OD), for both a 2×2 (a) and a 4×2 (b) MIMO precoding schemes and a given SNR of 0 dB
Figure 4:
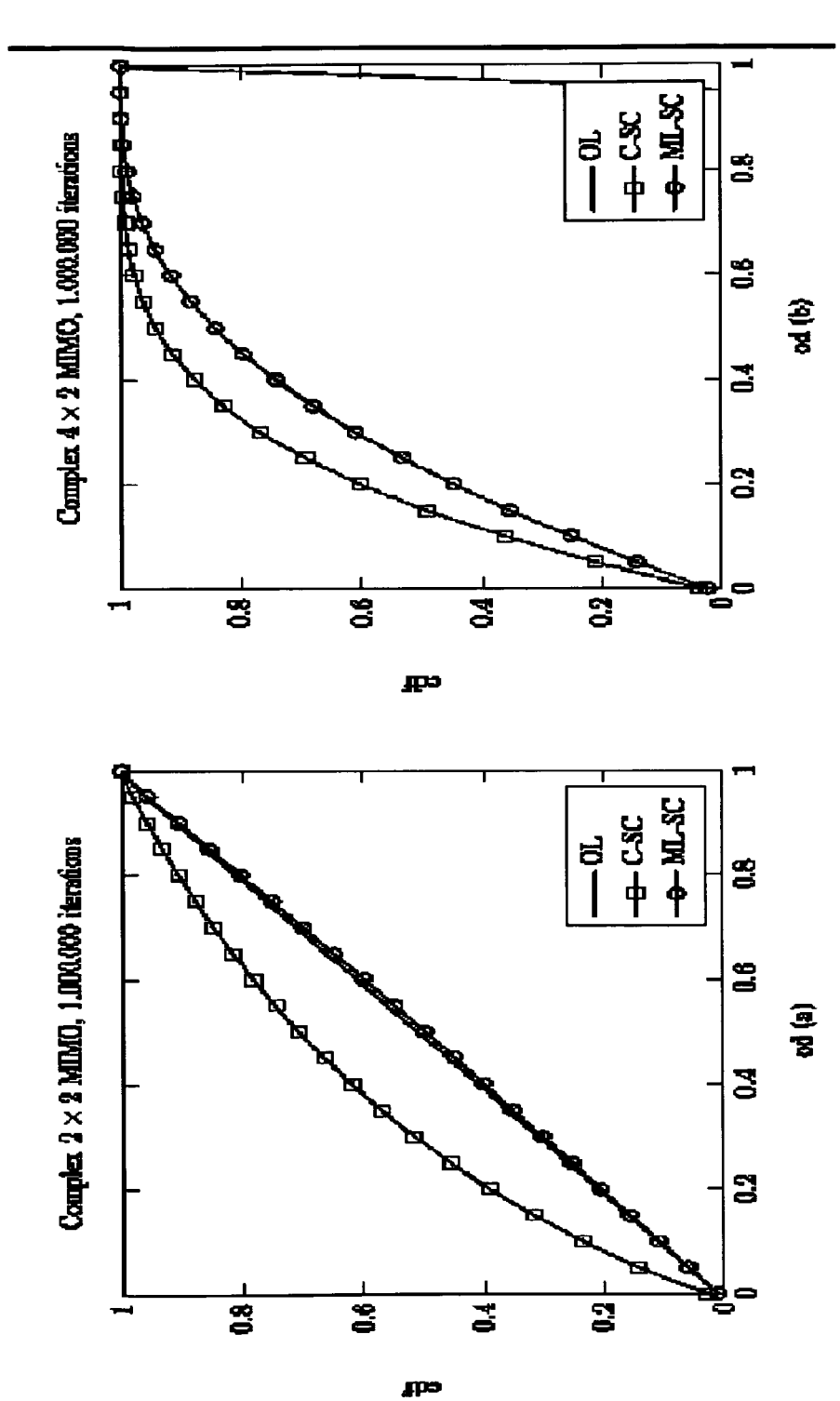
FIG. 4 illustrates the Cumulative Density Function (CDF) of the Orthogonal Deficiency (OD), for both a 2×2 (a) and a 4×2 (b) MIMO precoding schemes and a given SNR of 20 dB

The Cumulative Density Function (CDF) of the od is depicted in FIG. 3 in the OL case, and in the CL case for both ML-SC and C-SC in a 2×2 (a) and a 4×2 (b) MIMO precoding schemes.

It can be noticed that an appropriate precoding bounds strictly below 1 the od of the effective channel in the case of a 4×2 MIMO system, by noting that the bound depends of the used codebook and of the selection criterion.

Figure 5:
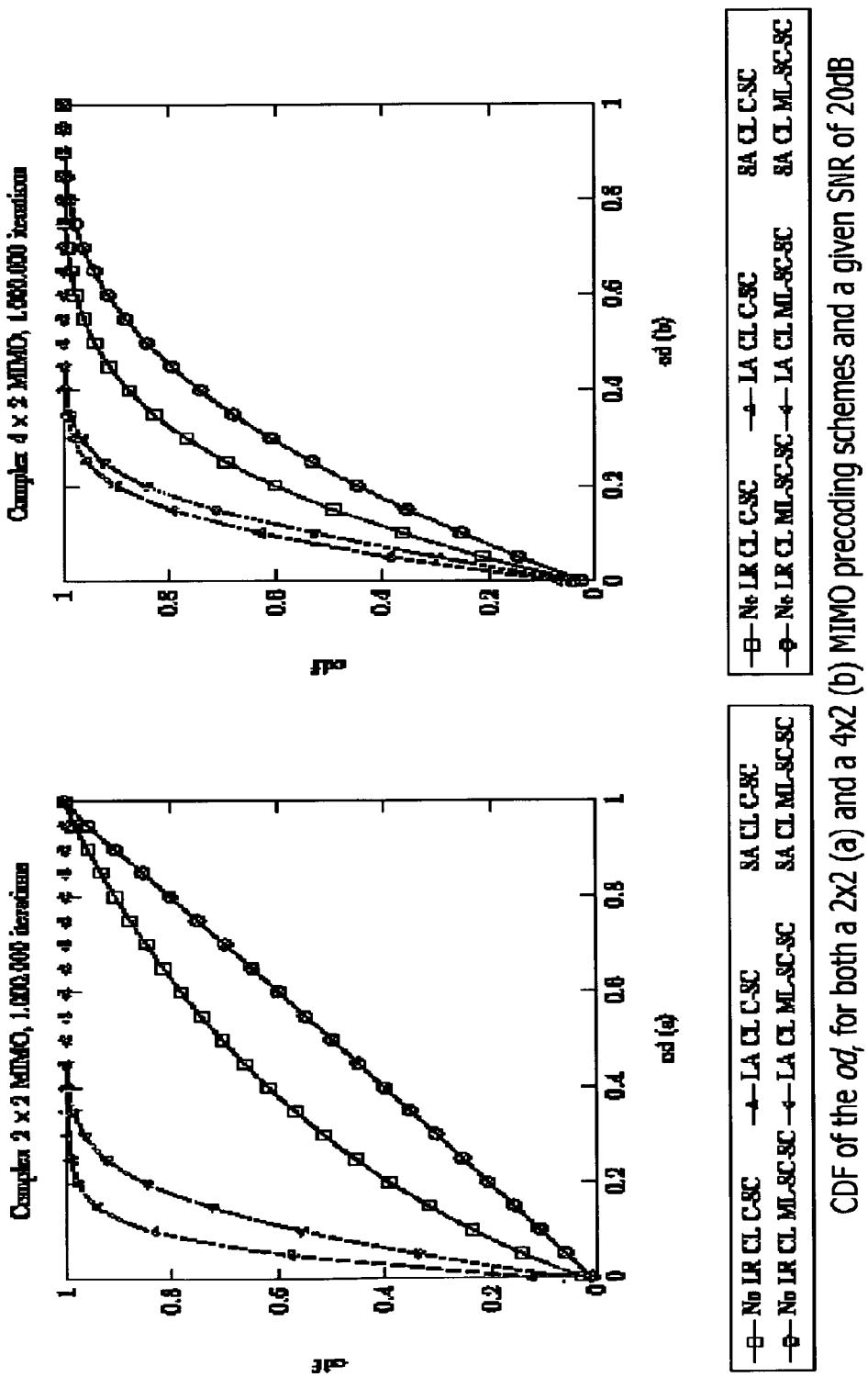
FIG. 5 illustrates the CDF of the OD, for both a 2×2 (a) and a 4×2 (b) MIMO precoding schemes and a given SNR of 20 dB, in the case of multiple precoding schemes associated to both a LLL Algorithm-based and a Seysen Algorithm-based Lattice Reductions.
Figure 6:
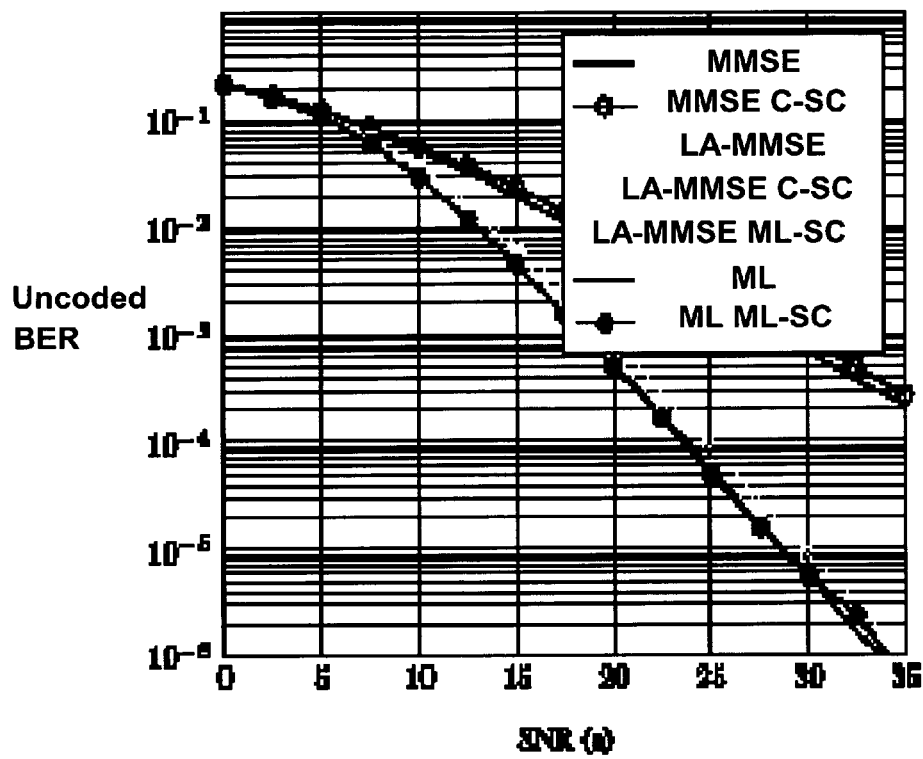
FIG. 6 shows the Uncoded BER as a function of SNR, in the case of a complex 2×2 MIMO channel, by considering MMSE, LA-Aided MMSE and ML detectors, and with QPSK modulations on each layer

As depicted in FIG. 5 (left), there is no more bounding of the od strictly below 1 in 2×2 MIMO precoding scheme, i.e. its maximal value by definition is reached. Also, it must be noted that the od bounds depend on the SNR in the C-SC case only.

Another promising point lies in the observation that this bound does not depend on the SNR in the case of the ML-SC, which offers an advantage over Sphere Decoding-like techniques. In particular:

$$od(HW) \le 0.84$$

Since the od criterion and the condition (1) in the LLL-based LR algorithm (namely the orthogonality criterion) are closely linked, the skilled man would expect that a precoding step prior to the LR step would induce a promising computational complexity reduction, at least in mean.

III. Simulation Results

The CDF of the od is depicted in FIG. 5 in the OL case, and in the CL case for both ML-SC and C-SC and both LA and SA for a complex 2×2 (a) and a 4×2 (b) MIMO precoding schemes.

FIG. 5 aims at showing that the precoding step not only offers a computational complexity reduction of the LR algorithm. The performance in term of od is also improved compared to the OL case, which shows the interest of associating both LR and precoding that are two different while complementary steps.

More accurate considerations are offered in Table 1, where the expected and maximum computational complexities for both LA and SA are given for $10^6$ Monte-Carlo simulations, keeping in mind that LA as well as SA is independent of SNR (only of the channel realization). Results are given with the following hypothesis: a real product requires 1 MUL, a real addition requires 0 MUL, a real division requires 16 MUL and a real square root requires 32 MUL.

TABLE 1

Mean and maximum computational complexities in OL, CL C-SC and CL ML-SC cases, in a complex 2 x 2 MIMO case.

|     | OL   |      | CL C-SC |      | CL ML-SC |      |
| --- | ---- | ---- | ------- | ---- | -------- | ---- |
|     | mean | max  | mean    | max  | mean     | max  |
| CLA | 223  | 1225 | 165     | 1224 | 227      | 1226 |
| SA  | 1373 | 3200 | 1233    | 3200 | 1381     | 3200 |

For the LA, the computational complexity gain compared to the OL case is 26% and 0% in mean for C-SC and ML-SC respectively. For the SA, the gain is 10% and 0% in mean for C-SC and ML-SC respectively. There is no gain for the algorithm UB for both LA and SA and whatever the SC, which is consistent to aforementioned highlights. Consequently, there is no advantage in the use of a precoding step concerning the LR computational complexity with the 2×2 MIMO precoding scheme.

In FIG. 5, uncoded BER performances are plotted for both OL and CL with the appropriate SC as a function of the SNR, with $10^7$ Monte-Carlo simulations per SNR value. The figure depicts the ML detector and the MMSE equalizer as references. These classical performance results are compared to the LRA MMSE Extended [1] equalizer performance.

It can be observed that the LRA detection schemes achieve full diversity in both OL and CL with a SNR offset that depends on the employed detector.

Similarly to what has been previously done, the expected and maximum computational complexities for both LA and SA are given in Table 2 for $10^6$ Monte-Carlo simulations.

TABLE 2

Mean and maximum computational complexities in OL, CL C-SC and CL ML-SC cases, in complex 4 x 2 MIMO case.

|     | OL   |      | CL C-SC |      | CL ML-SC |      |
| --- | ---- | ---- | ------- | ---- | -------- | ---- |
|     | mean | max  | mean    | max  | mean     | max  |
| LA  | 223  | 1226 | 159     | 509  | 176      | 746  |
| SA  | 1373 | 3200 | 971     | 1856 | 1079     | 2304 |

For the LA, the computational complexity gain compared to the OL case is 29% and 21% in mean for C-SC and ML-SC respectively. For the SA, the gain is 29% and 21% in mean for C-SC and ML-SC respectively.

For the LA, the computational complexity UB gain compared to the OL case is 58% for the C-SC. For the SA, the UB gain is 42% for the C-SC. Consequently, there is an advantage in the use of a precoding step on the LR computational complexity 2×2 MIMO precoding scheme with the 4×2 MIMO precoding scheme; the UB has been importantly decreased, which is an essential aspect for implementation that confirms that the LRA detectors offers promising perspectives in the achievement of near-optimum performances for a low computational complexity.

Figure 7:
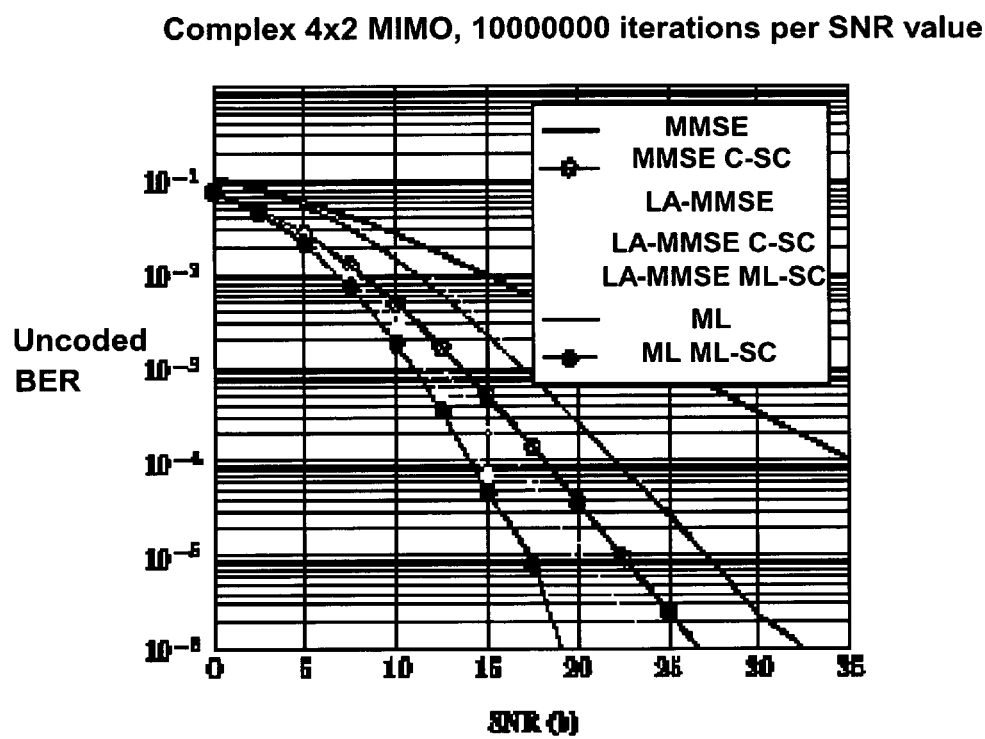
FIG. 7 illustrates the Uncoded BER as a function of SNR, in the case of a complex 4×2 MIMO channel, by considering MMSE, LA-Aided MMSE and ML detectors, and with QPSK modulations on each layer.

In FIG. 7, uncoded BER performances are plotted for both the OL and the CL with the appropriate SC as a function of the SNR, with $10^7$ Monte-Carlo simulations per SNR value. The figure depicts the ML detector and the MMSE equalizer as references. These classical performance results are compared to the LRA MMSE Extended equalizer performance.

It can be seen that the LRA detection schemes achieve full diversity in both OL and CL with a SNR offset that depends on the employed detector. The precoding interest in term of performance is particularly visible is this case due to the increased channel capacity.

The main advantage in the use of LRA techniques, to which this invention relates, relies in providing quasi-optimal detection performances and an advantage over competition.

While the expected computational complexities of all the aforementioned classical LR algorithms has been shown to be significantly decreased, the main advantage of the invention lies in exhibiting the maximal computational complexity decrease with the 4×2 MIMO precoding scheme;

It is an essential aspect for the hardware calibration that can be done more advantageously in CL, with no performance loss, and with a reduced complexity;

The LRA detectors offers promising perspectives in the achievement of near-optimum performances for a reduced computational complexity

REFERENCES

[1] D. Wuebben, R. Boehnke, V. Kuhn, and K.-D. Kammeyer, "Near-maximum-likelihood detection of mimo systems using mmse-based lattice reduction". vol. 2, pp. 798-802, 2004.

[2] L. Barbero, T. Ratnarajah, and C. Cowan, "A comparison of complex lattice reduction algorithms for mimo detection", *Acoustics, Speech, and Signal Processing, International Conference on*, pp. 2705-2708, 2008.

[3] D. Love, and R. Heath. "Limited feedback unitary precoding for spatial multiplexing systems", *Information theory, IEEE Transactions on*, vol. 51, no. 8, pp. 2967-2976, 2005.

[4] A. K. Lenstra, H. W. Lenstra, and L. Lovàsz, "Factoring polynomials with rational coefficients", *Mathematische Annalen*, vol. 261, no. 4, pp. 515-534, December 1982.

[5] J. Jaldén, D. Seethaler, and G. Matz, "Worst-And Average-Case Complexity of LLL Lattice Reduction in MIMO Wireless Systems", *Acoustics, Speech, and Signal Processing, International Conference on*, pp. 2685-2688, 2008.

[6] E.-U. Technical Specification Group RAN, "36.101 User Equipment (UE) radio transmission and reception v8.8.0," Tech. Rep., September 2009.

The invention claimed is:

1. A process for selecting a Precoding Matrix Index (PMI) in a Multiple In Multiple Out (MIMO) receiver used in a wireless communications system comprising a base station communicating with User Equipments through a downlink and uplink channel, said base station applying a precoding on a transmit symbol vector based on a matrix $W_i$ being selected from a set of predefined matrices and identified by a PMI index computed by said UE and forwarded to said base station via said uplink, said process comprising:

estimating a MIMO channel matrix H of a given set of resources blocks comprising received symbol vectors;

computing for each particular matrix $W_i$ comprised within said set of predefined matrices a value of a cost function $F_i(W_i, H)$ representative of an orthogonality of said matrix MIMO channel matrix H;

comparing computed values of said cost function $F_i$; and transmitting to said base station an index i of one of the predefined matrices maximizing or minimizing said $F_i$ cost function.

2. The process according to claim 1, wherein said cost function $F_i(W_i, H)$ is based on a condition number.

3. The process according to claim 1, wherein said cost function $F_i(W_i, H)$ is based on an orthogonal deficiency of said MIMO channel matrix, defined as follows:

$$od(WH) = 1 - \frac{\det(H^H H)}{\prod_{i=1}^{n_T} \|WH_i\|^2}.$$

4. The process according to claim 1, wherein said receiver is an orthogonal frequency-division multiplexing (OFDM) receiver supporting MIMO spatial-multiplexing mode, such as defined in IEEE 802.16, IEEE 802.11, 3GPP LTE and 3GPP LTE-A.

5. The process according to claim 1, wherein said receiver is a 2×2 MIMO receiver.

6. The process according to claim 1, wherein said receiver is a 4×2 MIMO receiver.

7. A receiver for a Multiple In Multiple Out (MIMO) wireless communications system comprising a base station communicating with User Equipments through a downlink and uplink channel, said base station applying a precoding on a transmit symbol vector based on a matrix $W_i$ being selected from a set of predefined matrices and identified by a PMI index computed by said UE and forwarded to said base station via said uplink, said receiver including:

means for estimating a MIMO channel matrix H of a given set of resources blocks comprising received symbol vectors;

means for estimating a variance $\sigma^2_n$ of an additive noise means for computing, for each particular matrix $W_i$ comprised within said set of predefined matrices a value of a cost function $F_i(W_i, H)$ representative of an orthogonality of said matrix MIMO channel matrix H;

means for comparing computed values of said cost function $F_i$; and means for transmitting to said base station an index i of one of the predefined matrices maximizing or minimizing said Fi cost function.

8. The receiver according to claim 7, wherein said cost function $F_i(W_i, H)$ is based on a condition number.

9. The receiver according to claim 7, wherein said cost function $F_i(W_i, H)$ is based on an orthogonal deficiency of said MIMO channel matrix, defined as follows:

$$od(WH) = 1 - \frac{\det(H^H H)}{\prod_{i=1}^{n_T} \|WH_i\|^2}.$$

10. The receiver according to claim 7, wherein said receiver is an OFDM receiver supporting MIMO spatial-multiplexing mode, such as defined in IEEE 802.16, IEEE 802.11, 3GPP LTE and 3GPP LTE-A.

11. The receiver according to claim 7, wherein said receiver is a 2×2 MIMO receiver.

12. The receiver according to claim 7, wherein said receiver is a 4×2 MIMO receiver.

13. A User Equipment comprising a receiver as defined in claim 7.

14. A mobile telephone comprising a receiver as defined in claim 7.

* * * * *